(12) United States Patent
Little (10) Patent No.: US 6,200,079 B1
(45) Date of Patent: Mar. 13, 2001

(54) RAILCAR LOAD TIE-DOWN BELT WINDING AND STORAGE APPARATUS

(75) Inventor: Heward Cecil Little, North Vancouver (CA)

(73) Assignee: Westran Holdings Limited, New Westminster (CA)

( * ) Notice: Subject to any disclaimer, the term of this patent is extended or adjusted under 35 U.S.C. 154(b) by 0 days.

(21) Appl. No.: 09/395,053

(22) Filed: Sep. 13, 1999

(51) Int. Cl.[7] .................................................. B60P 7/08
(52) U.S. Cl. .......................... 410/103; 710/100; 710/106
(58) Field of Search .............................. 410/97, 101, 100, 410/103, 106; 242/395, 532.6, 129.3, 905; 24/265 CD, 68 CD; 254/323; 105/355

(56) References Cited

U.S. PATENT DOCUMENTS

| | | | |
|---|---|---|---|
| 2,449,600 | * | 9/1948 | Geiger .................................. 410/100 |
| 3,428,331 | * | 2/1969 | Morgan et al. ...................... 410/100 |
| 3,647,152 | * | 3/1972 | Trewella ........................... 242/532.6 |
| 3,848,889 | * | 11/1974 | Sharrow .............................. 410/103 |
| 3,946,964 | * | 3/1976 | Zinser .............................. 242/532.6 |
| 4,007,887 | * | 2/1977 | Vice ................................. 242/532.6 |
| 4,266,740 | * | 5/1981 | Ramos et al. ..................... 242/532.6 |
| 4,311,288 | * | 1/1982 | Galland ............................. 242/532.6 |
| 4,390,141 | * | 6/1983 | Webster .......................... 410/100 X |
| 5,460,465 | | 10/1995 | Little ................................. 410/100 |
| 5,791,844 | * | 8/1998 | Anderson ............................ 410/103 |
| 5,899,646 | * | 5/1999 | Tatina et al. ....................... 410/100 |
| 5,941,666 | * | 8/1999 | Waters ............................... 410/100 |
| 5,961,263 | * | 10/1999 | Nunez ................................ 410/103 |
| 5,993,127 | * | 11/1999 | Shinn ................................. 410/100 |
| 6,059,499 | * | 5/2000 | Bird ................................... 410/103 |

* cited by examiner

Primary Examiner—Stephen T. Gordon
(74) Attorney, Agent, or Firm—Oyen Wiggs Green & Mutala (57) ABSTRACT

A belt winding and storage compartment is fixed to an outward facing railcar surface. An aperture is provided in a front wall portion of the compartment. A belt winder is removably insertable through the front wall aperture to coil at least a portion of the belt inside the compartment. The belt winder incorporates first and second rods which are fixed at a right angle. A spaced-apart pair of belt-receiving members are fixed to and extend outwardly from an upper end of the first rod, parallel to the second rod and in a direction opposite to the direction at which the second rod extends relative to the first rod. In one embodiment, an aperture is provided in the railcar surface, in alignment with the front wall aperture. The aligned apertures rotatably support opposed ends of the belt-receiving members as the belt is coiled inside the compartment. In an alternative embodiment, a belt winder support and belt guide plate is fixed to the outward facing railcar surface. An aperture is provided in the plate in alignment with the front wall aperture. The aligned apertures rotatably support opposed ends of the belt-receiving members as the belt is coiled inside the compartment. The belt winder support and belt guide plate is preferably spaced apart from an opposed front wall portion of the compartment by a distance which is just sufficient to accommodate a width dimension of the belt between the belt winder support and belt guide plate and the front wall portion. This prevents the belt edges becoming jammed against the front wall and/or railcar surface. Preferably, the compartment has a removable cover to prevent penetration of water, snow or ice inside the compartment.

8 Claims, 7 Drawing Sheets

RAILCAR LOAD TIE-DOWN BELT WINDING AND STORAGE APPARATUS

TECHNICAL FIELD

This invention pertains to an apparatus for winding and storing railcar load tie-down belts.

BACKGROUND

Railcar load tie-down systems are used to securely ship loads such as lumber, pipe, etc. U.S. Pat. No. 5,460,465 issued Oct. 24, 1995 discloses one such system which employs a plurality of spaced-apart belts, each of which are anchored at one end to one side of the railcar. Each belt can be routed over the load and wound upon a winch provided on the opposed side of the railcar. The winch is then tightened to tension the belt against the load.

It is relatively common for railcars to make "empty" return trips after delivery of a load to a destination, or to travel "empty" to a location at which a load is to be placed upon the railcar. Storage and handling of the aforementioned belts can be problematic during such "empty" trips.

It is known to provide a belt storage box on the railcar for each belt. The storage boxes are located near the points at which the respective belt ends are fixed to the railcar. If a belt is not required for load securement as aforesaid, a belt winding tool is used to wind into a tight coil all but the last few feet of the belt near the belt end fixed to the railcar. The coiled belt portion is then stuffed into the storage box provided for that belt. This prior art technique is timeconsuming and inefficient. The present invention improves upon the art by facilitating in situ winding and storage of railcar load tie-down belts.

SUMMARY OF INVENTION

In accordance with the invention, a belt winding and storage compartment is fixed to an outward facing railcar surface. An aperture is provided in a front wall portion of the compartment. A belt winder having belt-receiving means is removably insertable through the front wall aperture to coil at least a portion of the belt inside the compartment.

Advantageously, the belt winder incorporates first and second rods which are fixed at a right angle. A spaced-apart pair of members are fixed to and extend outwardly from an upper end of the first rod, parallel to the second rod and in a direction opposite to the direction at which the second rod extends relative to the first rod.

In one embodiment, an aperture is provided in the railcar surface, in alignment with the front wall aperture. The aligned apertures rotatably support opposed ends of the belt-receiving means as the belt is coiled inside the compartment. In an alternative embodiment, a belt winder support and belt guide plate is fixed to the outward facing railcar surface. An aperture is provided in the plate in alignment with the front wall aperture. The aligned apertures rotatably support opposed ends of the belt-receiving means as the belt is coiled inside the compartment.

The belt winder support and belt guide plate is preferably spaced apart from an opposed front wall portion of the compartment by a distance which is just sufficient to accommodate a width dimension of the belt between the belt winder support and belt guide plate and the front wall portion. This prevents the belt edges becoming jammed against the front wall and/or railcar surface.

Preferably, the compartment has a removable cover to prevent penetration of water, snow or ice inside the compartment.

DESCRIPTION

Figure 1:
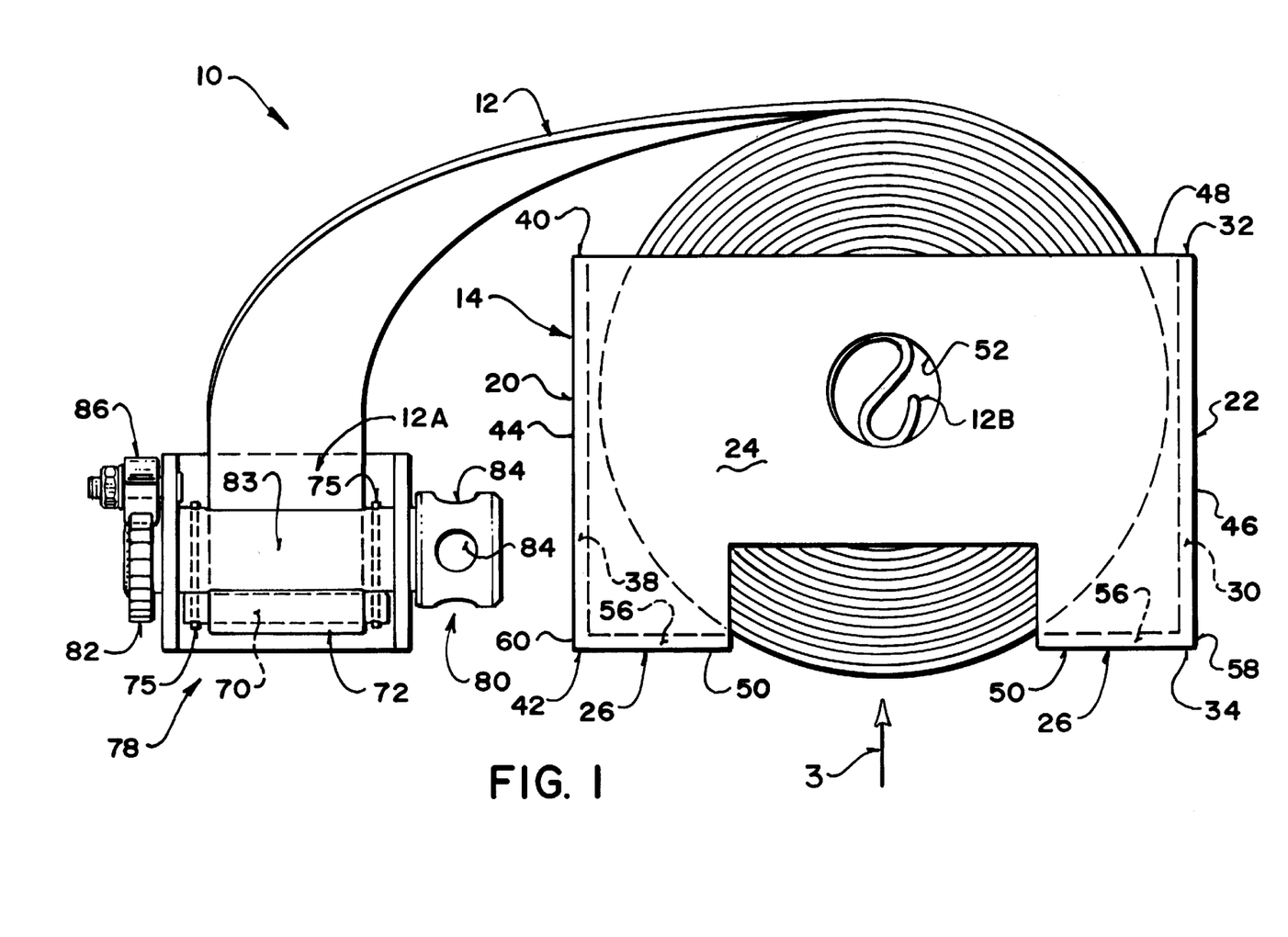
FIG. 1 is a side elevation view of a coiled belt portion stored in a belt winding and storage box in accordance with the present invention.
Figure 2:
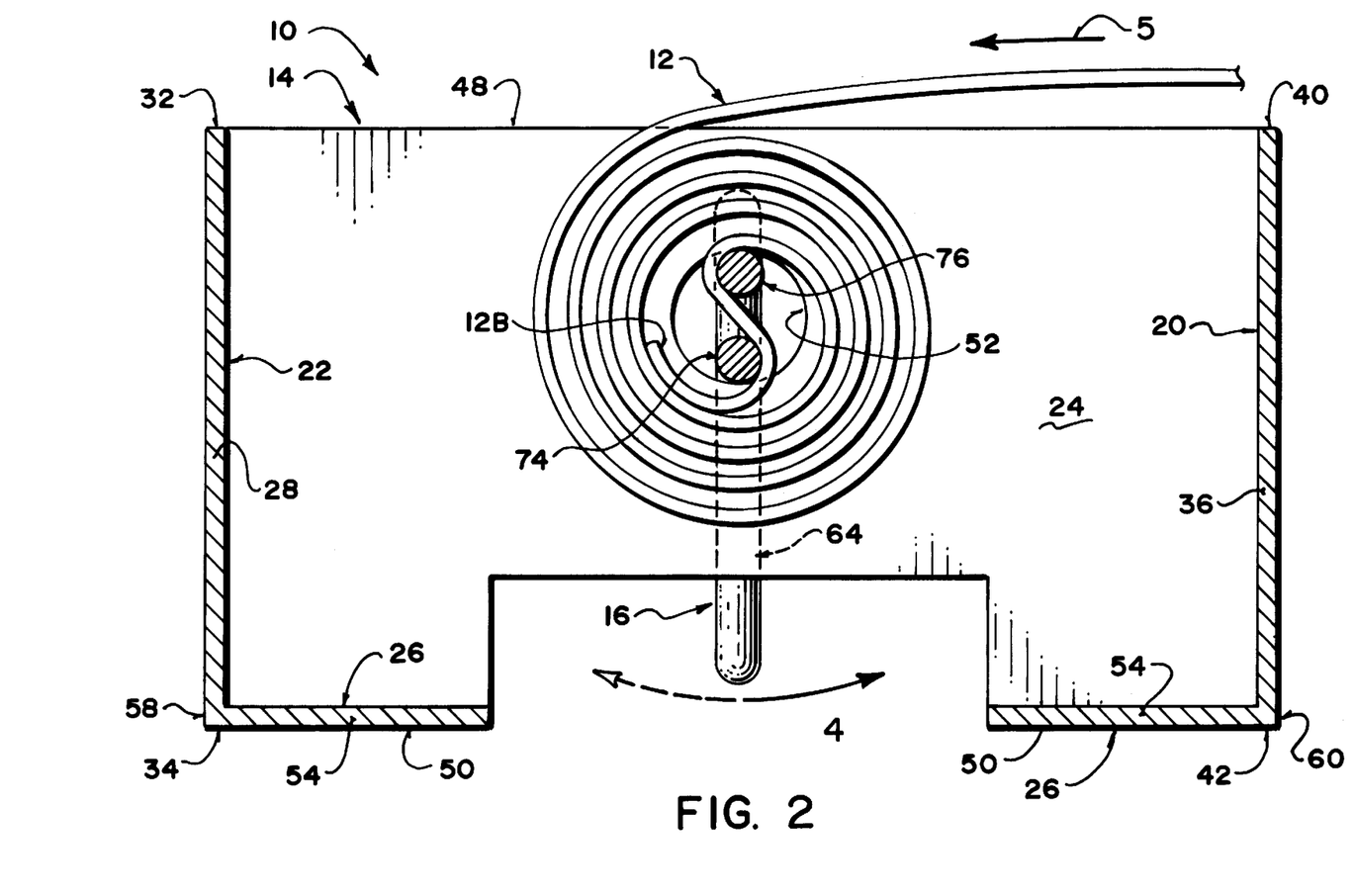
FIG. 2 is a section view showing the FIG. 1 belt winding and storage box from the side opposite that shown in FIG. 1 and showing a belt winder winding the belt inside the box.
Figure 3:
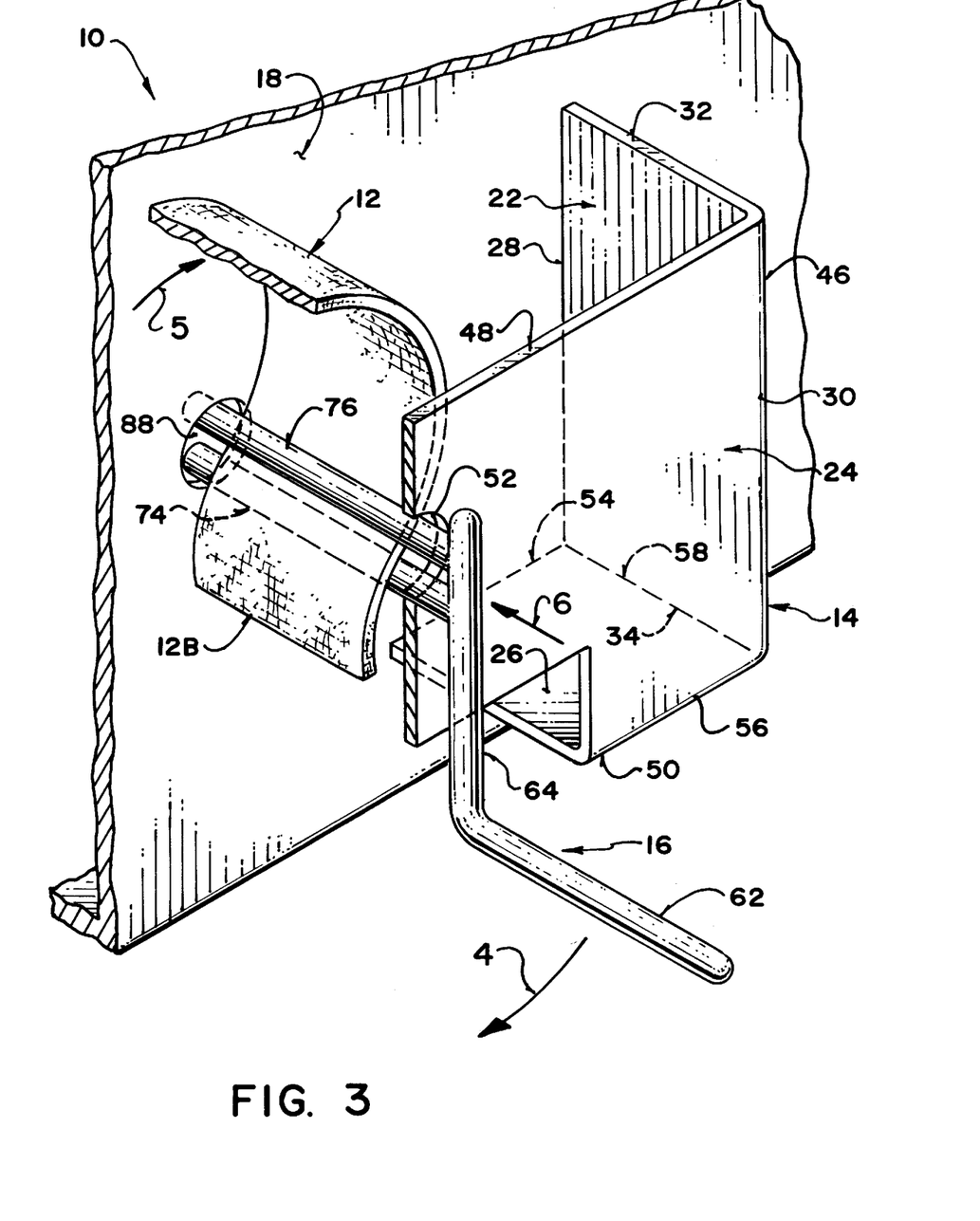
FIG. 3 is a partially fragmented oblique pictorial view of the belt winding and storage box of FIGS. 1 and 2.

FIGS. 1–3 illustrate a railcar load tie-down belt winding and storage apparatus 10. Generally, apparatus 10 incorporates load tie-down belt 12, belt winding and storage box 14, belt winder 16 and an outward facing portion of railcar side sill 18.

Box 14 has opposed vertical steel plate end walls 20, 22; vertical steel plate front wall 24; and, horizontal steel plate bottom wall 26. End wall 22 has opposed vertical edges 28, 30 and opposed horizontal edges 32, 34. Similarly, end wall 20 has opposed vertical edges 36, 38 and opposed horizontal edges 40, 42. End walls 20, 22 are welded or otherwise fixed to side sill 18 along edges 36, 28 respectively, and extend outwardly therefrom. End walls 20, 22 must extend from side sill 18 by a distance greater than the width of belt 12 to facilitate insertion and winding of belt 12 within box 14.

Front wall 24 has opposed vertical edges 44, 46 and opposed horizontal edges 48, 50. Front wall 24 and end wall 22 are joined (i.e. welded) along edges 46, 30 respectively; and, front wall 24 and end wall 20 are similarly joined along edges 44, 38 respectively. Front wall 24 thus extends parallel to railcar surface 18, and is spaced outwardly therefrom. An aperture 52 is provided in front wall 24.

Bottom wall 26 extends outwardly from side sill 18 and has two pairs of opposed horizontal edges; 54, 56 and 58, 60. Bottom wall 26 is joined (i.e. welded) to side sill 18 along edge 54. Bottom wall 26 and front wall 24 are joined (i.e. welded) along edges 56, 50 respectively. Bottom wall 26 and end wall 22 are joined (i.e. welded) along edges 58, 34 respectively. Bottom wall 26 and end wall 20 are joined (i.e. welded) along edges 60, 42 respectively.

Front wall 24 and bottom wall 26 may optionally have lower central portions removed therefrom as illustrated. In the case of bottom wall 26, the removed portion may extend from edge 54 to edge 56. These portions are removed to accommodate the lower coiled portion of belt 12 as shown in FIG. 1, to allow drainage of any moisture from inside box 14, and to ease removal of the coiled belt portion from box 14 by insertion an object (such as a workman's hand) to apply an upward force as indicated by arrow 3 in FIG. 1.

Belt winder 16 depicted in FIGS. 1–3, which is conventional in the art, is formed by connecting rigid rods 62, 64 at right angles. A spaced-apart pair of belt-receiving members 74, 76 are fixed to and extend outwardly from an upper end of rod 64, parallel to rod 62 and in a direction opposite to the direction at which rod 62 extends relative to rod 64.

A first end 12A of belt 12 is secured to winch 78 (FIG. 1). The opposed, second end 12B of belt 12 is threaded between belt-receiving members 74, 76 as shown in FIG. 3. End 12A of belt 12 is fed through a slot (not shown) in winch drum 83. Belt 12 is secured to drum 83, for example by passing pin 70 through a loop 72 sewn in belt end 12A and then fastening the opposed ends of pin 70 which protrude through the loop to drum 83 by means of rivets 75 or other suitable fasteners. A steel bar may be inserted into one of winch apertures 84 in winch drum extension 80 to provide leverage for winding belt 12 on drum 83. In order to relieve the belt tension to unwind belt 12 from drum 83, ratchet pawl 86 is lifted upwardly away from the teeth of ratchet wheel 82 to enable free reverse rotation of drum 83. Alternatively, if winch 78 is not required to anchor belt end 12B on the railcar, one could fix belt end 12B directly to the railcar. In such case, another winch (not shown) can be provided on the opposite side of the railcar to receive belt end 12A and tension belt 12 in tying a load down on the railcar.

Box 14 is fixed to side sill 18 relatively close to winch 78. Although attachment of box 14 to side sill 18 is preferred, it will be sufficient to fix box 14 to any outward facing portion of the railcar within relatively close proximity to winch 78.

An aperture 88 (FIG. 3) is provided in side sill 18 in alignment with front wall aperture 52. Belt-receiving members 74, 76 of belt winder 16 are inserted (as indicated by arrow 6) through the aligned apertures 52, 88 which rotatably support members 74, 76 at their opposed ends, as shown in FIG. 3. Belt 12 is then threaded between belt-receiving members 74, 76 as aforesaid. Rod 62 is then grasped and rotated in the direction of the solid line portion of arrow 4, drawing belt 12 in the direction of arrow 5 and coiling belt 12 around belt-receiving members 74, 76 inside box 14 as seen in FIG. 2 and 3. Belt first end 12A remains secured to winch 78, as described above.

After all but the last few feet of belt 12 extending between winch 78 and box 14 have been coiled inside box 14, belt winder 16 is removed by withdrawing belt-receiving members 74, 76 from apertures 52, 88 leaving belt 12 in the wound and stored position shown in FIG. 1 and thus ready for removal and use as required.

Figure 4:
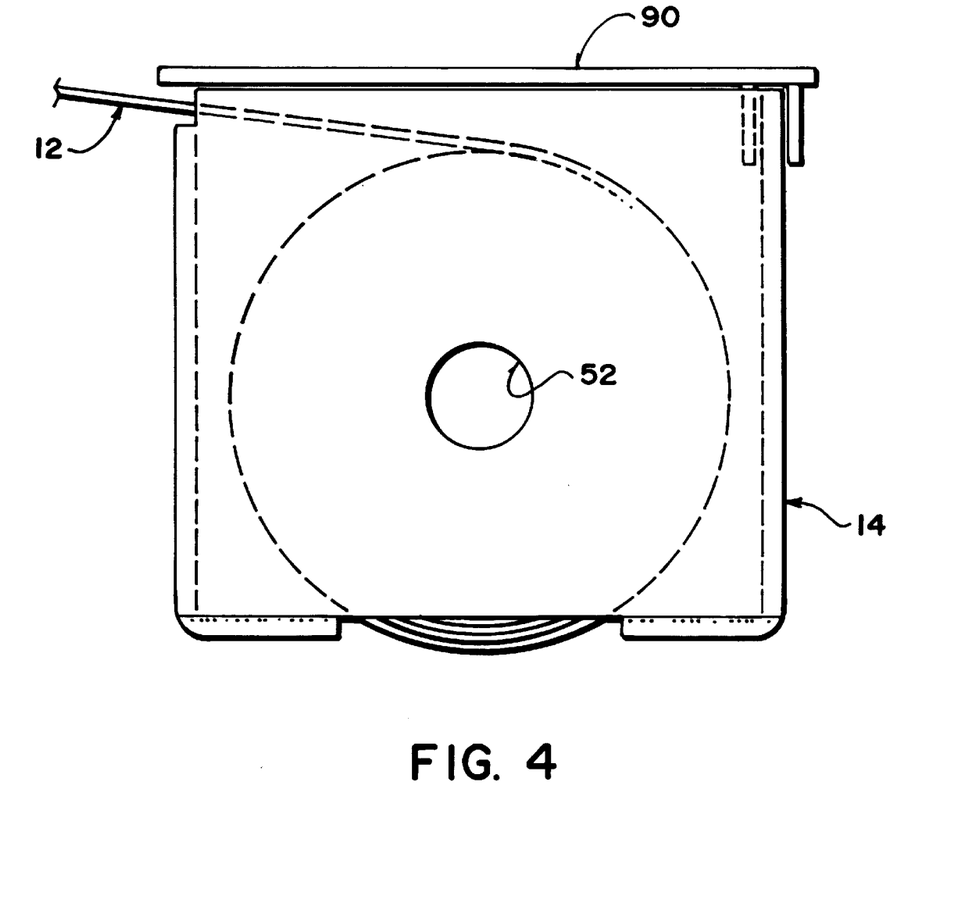
FIG. 4 schematically depicts a belt winding and storage box equipped with a removable cover.

Box 14 may be fitted with a removable cover 90 as shown in FIG. 4. Cover 90 prevents penetration of water, snow or ice into box 14. This in turn prevents the coiled belt portion stored inside box 14 from becoming frozen within box 14. Such freezing can make it difficult to remove the coiled belt portion from box 14 and difficult to uncoil the belt for use in tying down loads. A chain or other retention means can be connected between cover 90 and box 14 (or between cover 90 and a point on side sill 18 proximate box 14) to prevent loss of cover 90.

Figure 5A:
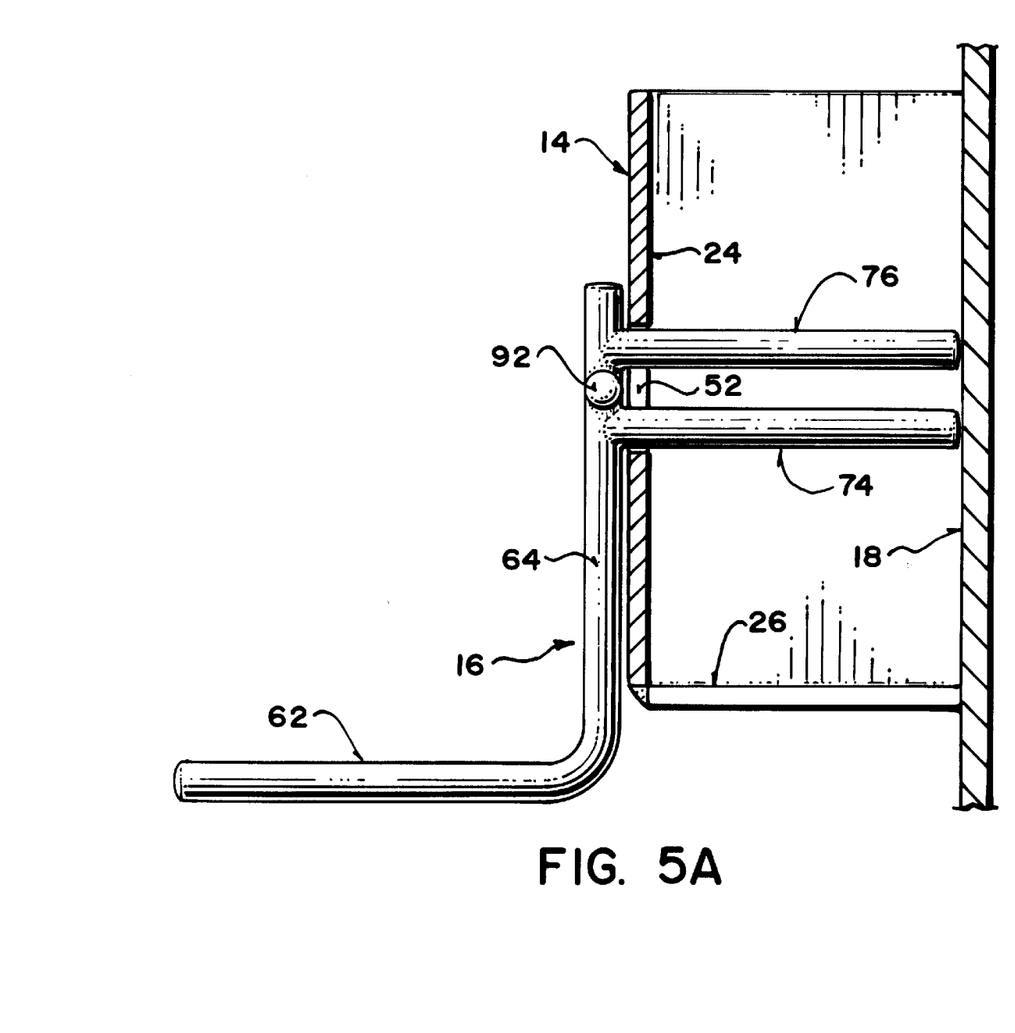
FIGS. 5A and 5B are respectively side elevation and end views of a belt winder having an integral stabilizer.
Figure 5B:
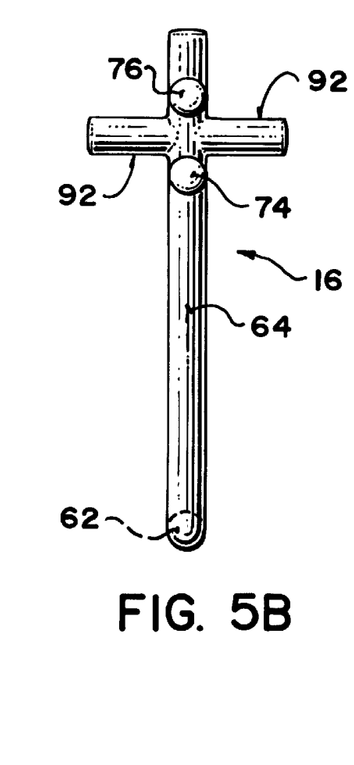

It is not essential to provide aperture 88 in side sill 18. Indeed, the thickness of the steel plate comprising a conventional railcar side sill may make it difficult and expensive to provide aperture 88 in side sill 18 and in alignment with aperture 52. If aperture 88 is not provided, then belt-receiving members 74, 76 can be stabilized by fixing a cross-piece 92 to rod 64 of winder 16 as shown in FIGS. 5A, 5B. When rod 62 is rotated as aforesaid to coil belt 12 around belt-receiving members 74, 76 cross-piece 92 and rod 64 bear against front wall 24 of box 14. Cross-piece 92 and rod 64 are thus maintained generally parallel to front wall 24 and belt-receiving members 74, 76 are consequently maintained generally perpendicular to front wall 24 to facilitate unimpeded winding of belt 12 inside box 14 as aforesaid.

Figure 6:
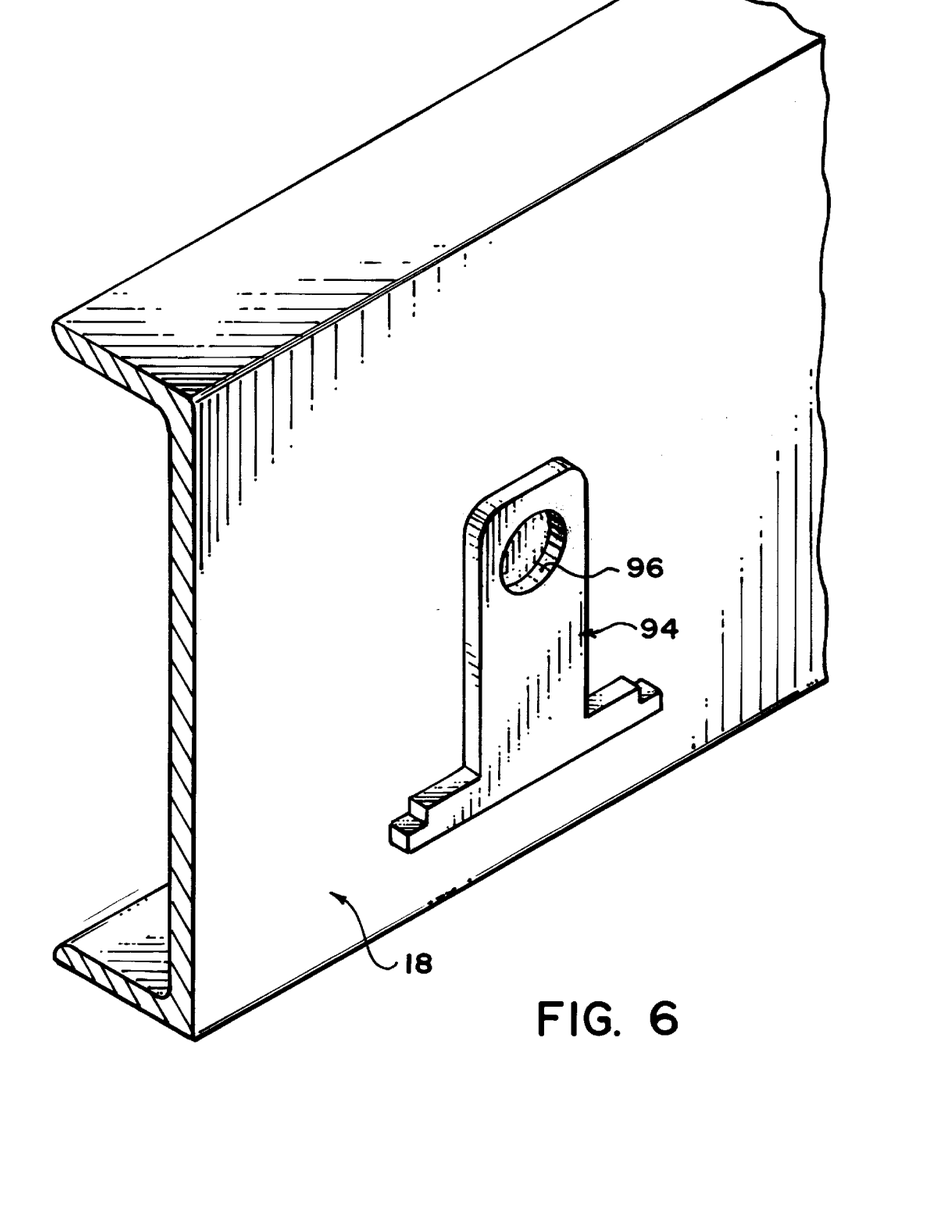
FIG. 6 is an oblique schematic illustration of a portion of a railcar side sill on which a belt winder support and belt guide plate is mounted.
Figure 7:
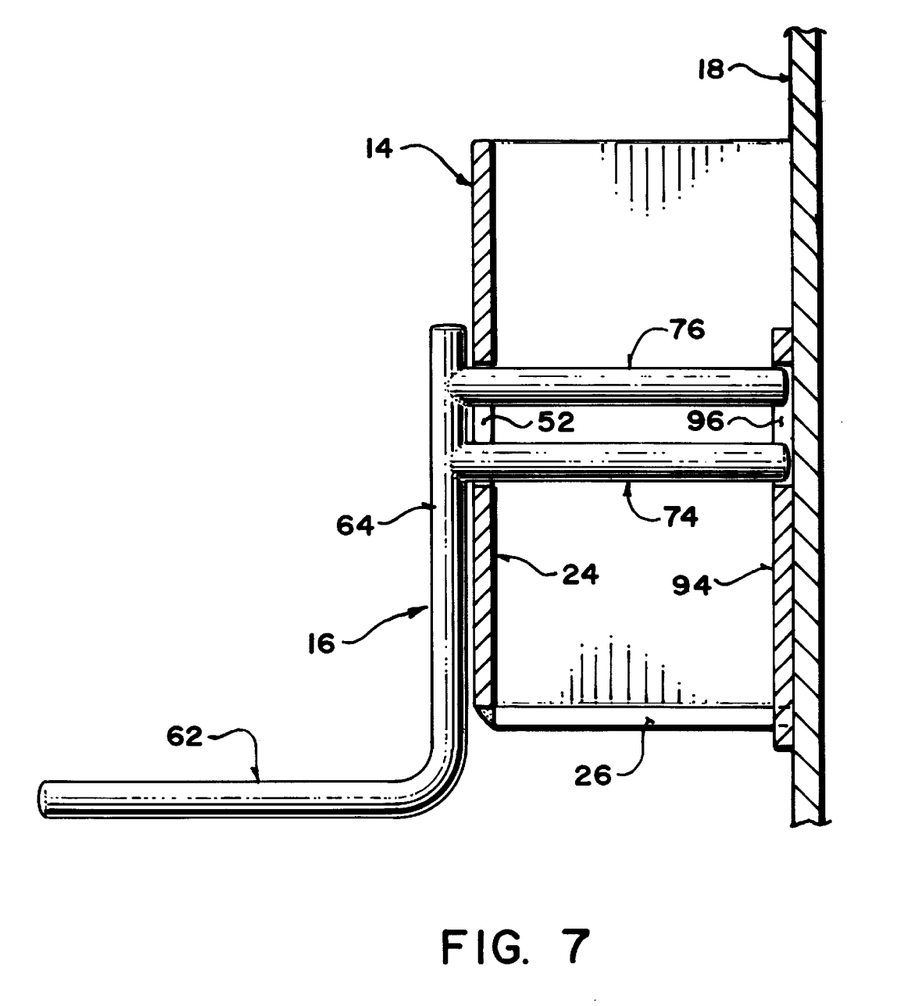
FIG. 7 is a cross-sectional end view of a belt winding and storage box fixed to the FIG. 6 railcar side sill over the belt winder support and belt guide plate, and showing a belt winder positioned to wind a belt inside the box.

FIGS. 6 and 7 depict a further alternative which may be employed if aperture 88 is not provided in side sill 18. A belt winder support and belt guide plate 94 is fixed (i.e. welded) to side sill 18 as shown in FIG. 6. An aperture 96 is provided in plate 94. Belt winding and storage box 14 is then fixed to side sill 18 as shown in FIG. 7, with aperture 52 in alignment with aperture 96. Belt-receiving members 74, 76 of winder 16 (without cross-piece 92) can then be inserted through apertures 52, 96 to rotatably support the opposed ends of members 74, 76 as belt 12 is coiled inside box 14 by rotating winder 16 as aforesaid. Belt winder support and belt guide plate 94 preferably has a thickness which is just sufficient to accommodate the width dimension of belt 12 between plate 94 and front wall 24. This ensures smooth winding of belt 12 inside box 14. If the displacement between plate 94 and front wall 24 is much larger than the width dimension of belt 12 then belt 12 may wind unevenly inside box 14 with the belt edges becoming jammed against front wall 24 and/or side sill 18 making it difficult to remove the coiled belt from box 14.

As will be apparent to those skilled in the art in the light of the foregoing disclosure, many alterations and modifications are possible in the practice of this invention without departing from the spirit or scope thereof. For example, box 14 need not be a "box", but may have any configuration capable of accommodating the width and diameter of coiled belt 12. As another example, instead of providing cross-piece 92 on winder 16 as shown in FIG. 5A and 5B, one may alternatively form rod 64 from flat bar stock. In such case, the flat bar bears against front wall 24 of box 14 to stabilize winder 16 as it is rotated to coil belt 12 inside box 14 as aforesaid. Accordingly, the scope of the invention is to be construed in accordance with the substance defined by the following claims.

What is claimed is:

1. Railcar load tie-down belt winding and storage apparatus, comprising:

(a) a belt;

(b) an outward facing railcar surface;

(c) a belt winding and storage compartment attached to said railcar surface, said compartment having a front wall with an aperture therein; and, (d) a belt winder having belt-receiving means removably insertable through said front wall aperture to coil at least a portion of said belt inside said compartment.

2. The apparatus of claim 1, wherein said belt winding and storage compartment is a box further comprising:

(a) first and second opposed vertical end walls which extend outwardly away from said railcar surface, each of said end walls having first and second opposed edges and third and fourth opposed edges, said third and fourth edges being substantially perpendicular to said first and second edges and of a length greater than the width of said belt, and wherein said first edges of said first and second end walls are attached to said railcar surface;

(b) said front wall defining a front vertical wall having said aperture, first and second opposed edges and third and fourth opposed edges, said first and second edges of said front wall being attached to said second edges of said first and second end walls, wherein said front wall is substantially parallel to said railcar surface; and, (c) a horizontal bottom wall having opposed first and second edges and opposed third and fourth edges, said first edge of said bottom wall being attached to said railcar surface, said second edge of said bottom wall being attached to said third edge of said front wall, said third edge of said bottom wall being attached to said third edge of said first end wall and said fourth edge of said bottom wall being attached to said third edge of said second end wall.

3. The apparatus of claim 1, said belt winder further comprising first and second rods fixed at a right angle, said belt-receiving means further comprising a spaced-apart pair of members fixed to and extending outwardly from an upper end of said first rod, parallel to said second rod and in a direction opposite to a direction at which said second rod extends relative to said first rod.

4. The apparatus of claim 1, further comprising an aperture in said railcar surface aligned with said front wall aperture, said aligned apertures for rotatably supporting opposed ends of said belt-receiving means.

5. The apparatus of claim 1, further comprising a removable cover for preventing penetration of water, snow or ice inside said compartment.

6. The apparatus of claim 1, further comprising a belt winder support and belt guide plate fixed to said outward facing railcar surface, said belt winder support and belt guide plate having an aperture aligned with said front wall aperture, said aligned apertures for rotatably supporting opposed ends of said belt-receiving means.

7. The apparatus of claim 6, wherein said belt winder support and belt guide plate is spaced apart from an opposed front wall portion of said compartment by a distance which is just sufficient to accommodate a width dimension of said belt between said belt winder support and belt guide plate and said front wall portion.

8. The apparatus of claim 1, further comprising a drainage aperture in a bottom portion of said compartment, said drainage aperture further for upward insertion through said drainage aperture of an object to facilitate removal of said belt from said compartment.

\* \* \* \* \*